(12) United States Patent
Kaneko et al.

(10) Patent No.: US 12,252,007 B2
(45) Date of Patent: Mar. 18, 2025

(54) LID OPENING/CLOSING DEVICE

(71) Applicant: TOYODA GOSEI CO., LTD., Kiyosu (JP)

(72) Inventors: Kenichiro Kaneko, Kiyosu (JP); Kazuki Fujisawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/495,286

(22) Filed: Oct. 26, 2023

(65) Prior Publication Data
US 2024/0140194 A1    May 2, 2024

(30) Foreign Application Priority Data

Nov. 2, 2022    (JP) ................................. 2022-176796

(51) Int. Cl.
*B60K 15/05*    (2006.01)
(52) U.S. Cl.
CPC ...... *B60K 15/05* (2013.01); *B60K 2015/0523* (2013.01); *B60K 2015/053* (2013.01); *B60K 2015/0538* (2013.01)
(58) Field of Classification Search
CPC ............ B60K 15/05; B60K 2015/0523; B60K 2015/053; B60K 2015/0538

USPC ....................................................... 296/97.22
See application file for complete search history.

(56) References Cited

U.S. PATENT DOCUMENTS

2022/0136291 A1*    5/2022    Sun ......................... E05B 83/34
49/280

FOREIGN PATENT DOCUMENTS

CN       110406370 A   *  11/2019
JP       2022-110989 A     7/2022

* cited by examiner

*Primary Examiner* — Mahmoud Gimie
(74) *Attorney, Agent, or Firm* — Posz Law Group, PLC

(57) ABSTRACT

A lid opening/closing device includes an actuator configured to generate first power for opening a lid, an external force operation mechanism configured to convert an external force into second power for opening the lid, and a power transmission mechanism configured to transmit the first and second power to the lid. The power transmission mechanism includes a first shaft configured to rotate by the first and second power, and a second shaft configured to open/close the lid by the rotation of the first shaft. The external force operation mechanism includes a rotation member. The power transmission mechanism includes an engagement switching portion. The rotation member is integrally incorporated into the power transmission mechanism, and is placed on a side, which is the same as a side on which the first shaft is placed, with respect to the actuator.

4 Claims, 8 Drawing Sheets

LID OPENING/CLOSING DEVICE

TECHNICAL FIELD

The present invention relates to a lid opening/closing device capable of opening/closing a lid for opening/closing an opening of a base member that is mounted on a vehicle body, for example.

BACKGROUND ART

Hitherto, a lid opening/closing device for opening/closing a lid has been known (e.g., Japanese Laid-Open Patent Publication No. 2022-110989). The lid is, for example, a lid member that is mounted on a vehicle body and opens/closes an opening of a base member through which a charge port, a fuel port, or the like of a vehicle is exposed. The lid opening/closing device described in Japanese Laid-Open Patent Publication No. 2022-110989 includes an actuator for generating power and an external force operation mechanism for emergency use. The actuator is caused to operate to generate power for opening/closing the lid when electric power is supplied thereto. The external force operation mechanism is a mechanism that is caused to operate by a manual operation of an operator even in an emergency such as a failure of the actuator, and converts an external force caused by the manual operation into power for opening the lid from a closed position to an opened position.

In the above lid opening/closing device, the power generated by the actuator and the power generated by the operation of the external force operation mechanism are transmitted to the lid via a rotation shaft. An output shaft of the actuator is directly connected to the rotation shaft. The rotation shaft is placed on one side in an axial direction with respect to the actuator, extends from the actuator to the one side in the axial direction, and is connected at one end thereof in the axial direction to the lid side.

The external force operation mechanism includes a rotation member placed on the other side in the axial direction with respect to the actuator. The rotation member is connectable to the output shaft of the actuator and further to the other end in the axial direction of the rotation shaft. Specifically, when no external force caused by a manual operation is applied to the rotation member, the rotation member is in a disengagement state where the rotation member is not connected to the rotation shaft, and when such an external force is applied to the rotation member, the rotation member becomes connected to and engaged with the rotation shaft. Therefore, when the external force operation mechanism is caused to operate by a manual operation of the operator, an external force caused by the manual operation is transmitted as power to the rotation shaft. Therefore, in the above lid opening/closing device, in an emergency, the lid is opened by a manual operation, not by actuator operation, as in the case of normal actuator operation.

SUMMARY OF INVENTION

Technical Problem

In the above lid opening/closing device, however, the rotation member of the external force operation mechanism is placed on the other side in the axial direction, which is opposite to the one side in the axial direction on which the rotation shaft is placed, with respect to the actuator. In this structure, in order to assemble the rotation shaft and the rotation member of the external force operation mechanism to the actuator, assembly work from both sides in the axial direction with respect to the actuator is required, which reduces the assemblability of the lid opening/closing device.

The present invention has been made in view of such circumstances, and an object of the present invention is to provide a lid opening/closing device having improved assemblability.

Solution to Problem

An aspect of the present invention is directed to a lid opening/closing device including: a lid configured to be opened/closed with respect to a base member between a closed position and an opened position; an actuator configured to generate first power for at least opening the lid; an external force operation mechanism configured to operate so as to convert an external force caused by a manual operation into second power for opening the lid; and a power transmission mechanism configured to transmit the first power and the second power to the lid, wherein the power transmission mechanism includes a first shaft placed on one side in an axial direction with respect to the actuator and configured to be rotatable by the first power generated by the actuator and to be rotatable by the second power generated by the operation of the external force operation mechanism, and a second shaft connected to the first shaft, connected to the lid, and configured to rotate to open/close the lid as the first shaft rotates, the external force operation mechanism includes a rotation member placed on the same axis as the first shaft and configured to be rotatable about the axis, the power transmission mechanism includes an engagement switching portion configured to disengage the first shaft and the rotation member from each other when the second power is not generated, and to bring the first shaft and the rotation member into engagement with each other such that the second power is transmitted to the second shaft via the first shaft and the second shaft rotates, when the second power is generated, and the rotation member is integrally incorporated into the power transmission mechanism, and is placed on a side, which is the same as a side on which the first shaft is placed, with respect to the actuator.

With this configuration, the assemblability is improved.

DESCRIPTION OF EMBODIMENTS

Hereinafter, a specific embodiment of the lid opening/closing device according to the present invention will be described with reference to FIG. 1 to FIG. 12.

A lid opening/closing device 1 according to the embodiment is a device for opening/closing a lid with respect to a base member. The lid opening/closing device 1 is mounted, for example, on a vehicle such as a gasoline vehicle, a diesel vehicle, an electric vehicle, and a hybrid vehicle, and is installed in a mounting hole 2a provided in a vehicle body surface 2 of a vehicle body side portion, a vehicle body front portion, or the like. For example, a supply port (specifically, a charge port, a fuel port, or the like: see FIG. 3) 3 for supplying energy to the vehicle is placed in the mounting hole 2a.

Figure 1:
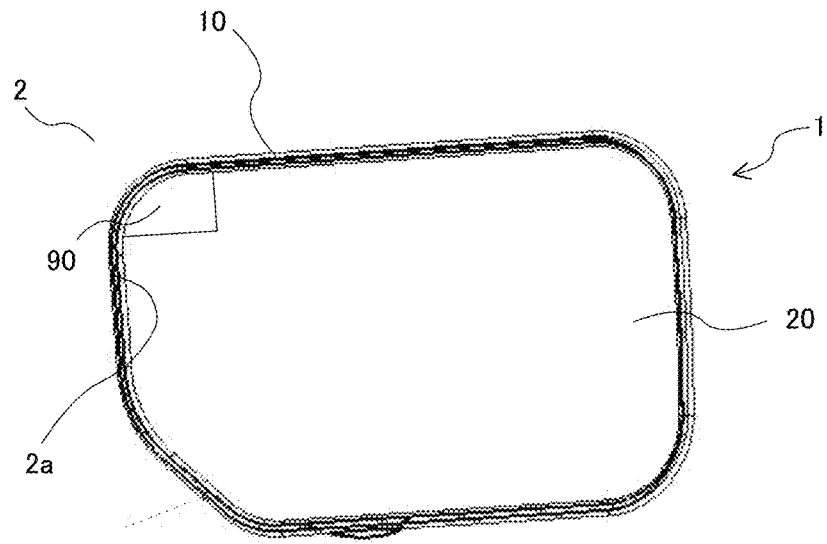
FIG. 1 is a perspective view of a lid opening/closing device according to an embodiment of the present invention from the front side at a lid closed position.
Figure 2:
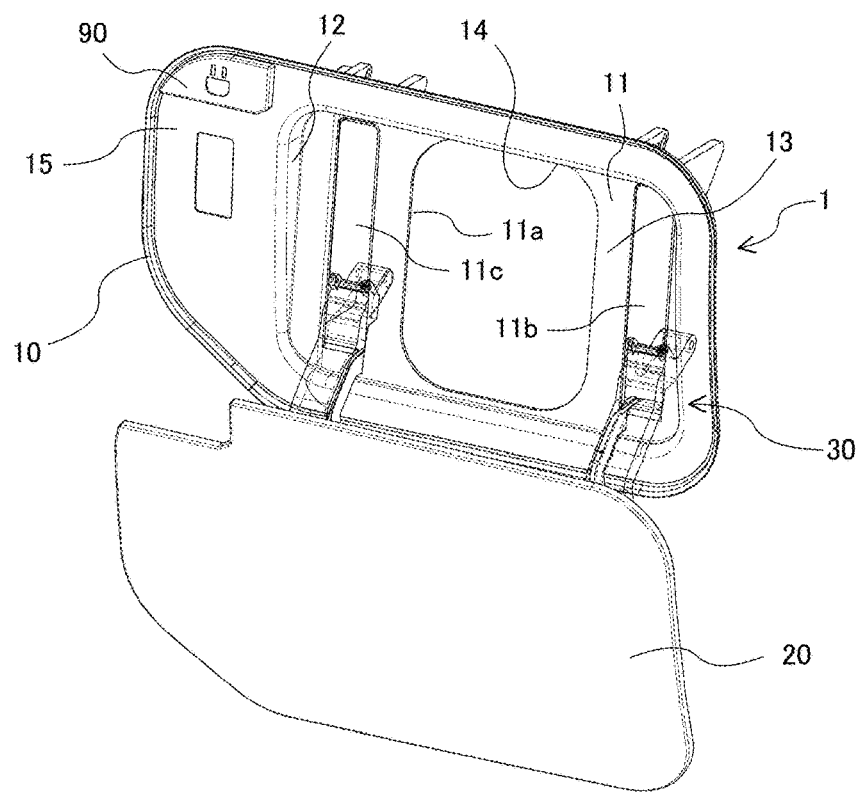
FIG. 2 is a perspective view (but a partially see-through view) of the lid opening/closing device of the embodiment from the front side at a lid opened position.
Figure 3:
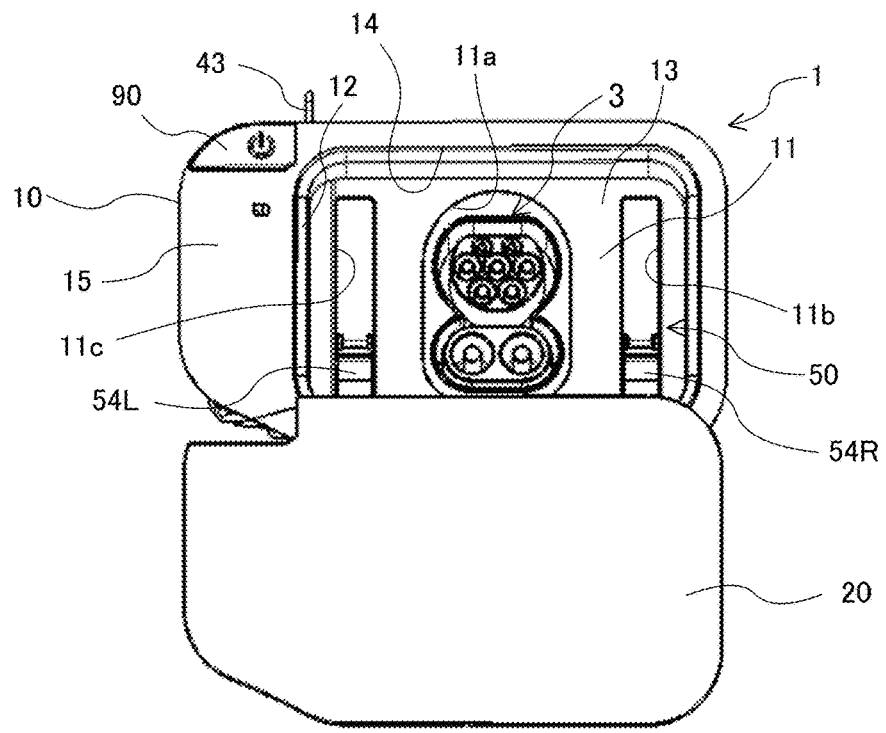
FIG. 3 is a front view of the lid opening/closing device of the embodiment at the lid opened position.
Figure 4:
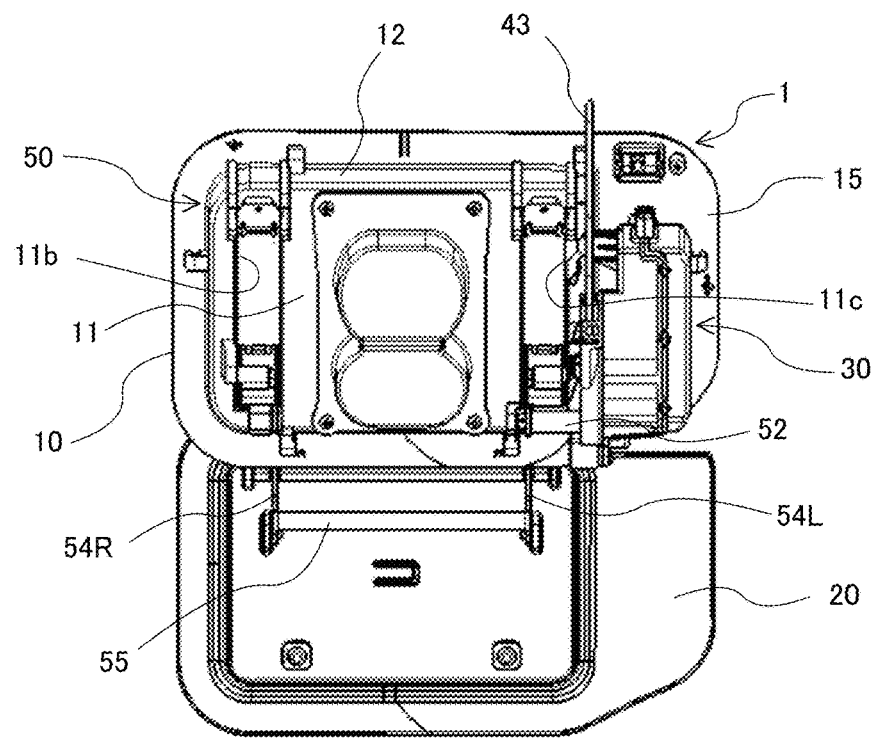
FIG. 4 is a back view of the lid opening/closing device of the embodiment at the lid opened position.

As shown in FIG. 1 and FIG. 2, the lid opening/closing device 1 includes a base member 10, a lid 20, an actuator 30, an external force operation mechanism 40, and a power transmission mechanism 50. The lid opening/closing device 1 transmits power generated by the actuator 30 to the lid 20 via the power transmission mechanism 50 during normal operation, and transmits power generated by operation of the external force operation mechanism 40 to the lid 20 via the power transmission mechanism 50 in an emergency such as a failure of the actuator 30, thereby opening/closing the lid 20 with respect to the base member 10 between a closed position and an opened position.

The base member 10 is a container-like or box-like box member in which the supply port 3 is housed. The base member 10 is mounted and fixed to the vehicle body surface 2 so as to be fitted into the mounting hole 2a. The base member 10 includes a bottom wall portion 11, a side wall portion 12, a housing space 13, and an opening 14. The base member 10 is a bottomed tubular member that is formed such that the bottom wall portion 11 is formed on a far side and the side wall portion 12 surrounds the bottom wall portion 11 to form the housing space 13 and in which the opening 14 is formed on a near side. The base member 10 is an injection-molded article molded from a resin or the like.

The supply port 3 is provided at one end of a pipe or cable connected at another end thereof to a fuel tank, a battery, or the like. The fuel tank or the battery is placed on the far side with respect to a first through hole 11a provided in the bottom wall portion 11. The supply port 3 is housed in the housing space 13 via the first through hole 11a. While the supply port 3 is hidden on the far side of the lid 20 at the closed position of the lid 20, the supply port 3 is exposed to the outside of the vehicle through the opening 14 at the opened position of the lid 20 so as to allow fuel supply and charging.

The base member 10 includes a frame portion 15. The frame portion 15 is formed in an annular shape along a peripheral portion of the opening 14, and is formed in a flange shape so as to extend in a frame outward direction from the peripheral portion of the opening 14. The base member 10 is positioned on the vehicle body surface 2 by bringing the back surface of the frame portion 15 into contact with a flange surface or the like at the periphery of the mounting hole 2a of the vehicle body surface 2.

The lid 20 is a lid member for opening/closing the opening 14 of the base member 10. The lid 20 is formed in a plate shape. The lid 20 is sized so as to match the opening 14 and the frame portion 15 at the periphery of the opening 14. The lid 20 closes the opening 14 at the closed position of the lid 20 such that the lid 20 is flush with the vehicle body surface 2. The surface of the lid 20 may be curved so as to match the vehicle body surface 2. The lid 20 is, for example, an injection-molded article molded from a resin.

The lid 20 is capable of being opened/closed so as to move between the closed position and the opened position. The closed position is a position at which the lid 20 closes the opening 14. In addition, the opened position is a predetermined position at which the lid 20 opens the opening 14. The lid 20 is supported so as to be movable in position relative to the base member 10. The lid 20 is opened/closed by the power from the actuator 30, not by a manual operation of an operator such as a vehicle user, during normal operation, and is opened/closed by the power, from the external force operation mechanism 40, caused by a manual operation of the operator in an emergency such as a failure of the actuator 30.

The actuator 30 is capable of generating power (hereinafter, referred to as first power) for at least opening the lid 20. The actuator 30 is capable of generating not only the first power for opening the lid 20 but also first power for closing the lid 20. The actuator 30 is an electric motor or the like that generates the first power when electric power is supplied thereto. The actuator 30 is rotatable in both a forward direction and a reverse direction.

The forward direction may refer to a direction in which the lid 20 is opened from the closed position to the opened position, and the reverse direction may refer to a direction in which the lid 20 is closed from the opened position to the closed position. In addition, in the following, the forward direction and the reverse direction are applied not only to the operation of the actuator 30, but also to the operation of each component of the external force operation mechanism 40 and the power transmission mechanism 50 described in detail later.

The actuator 30 is capable of being rotationally driven in a direction selected from the forward direction and the reverse direction. The actuator 30 is rotationally driven in the forward direction in accordance with an opening command from a controller when a predetermined switch opening operation (e.g., an operation of pressing a switch 90 shown in FIG. 1, FIG. 2, and FIG. 3) is performed by the operator at the closed position of the lid 20. In this case, the lid 20 is opened. In addition, the actuator 30 is rotationally driven in the reverse direction in accordance with a closing command from the controller when a predetermined switch closing operation (e.g., an operation of pressing the switch 90) is performed by the operator at the opened position of the lid 20. In this case, the lid is closed.

Figure 6:
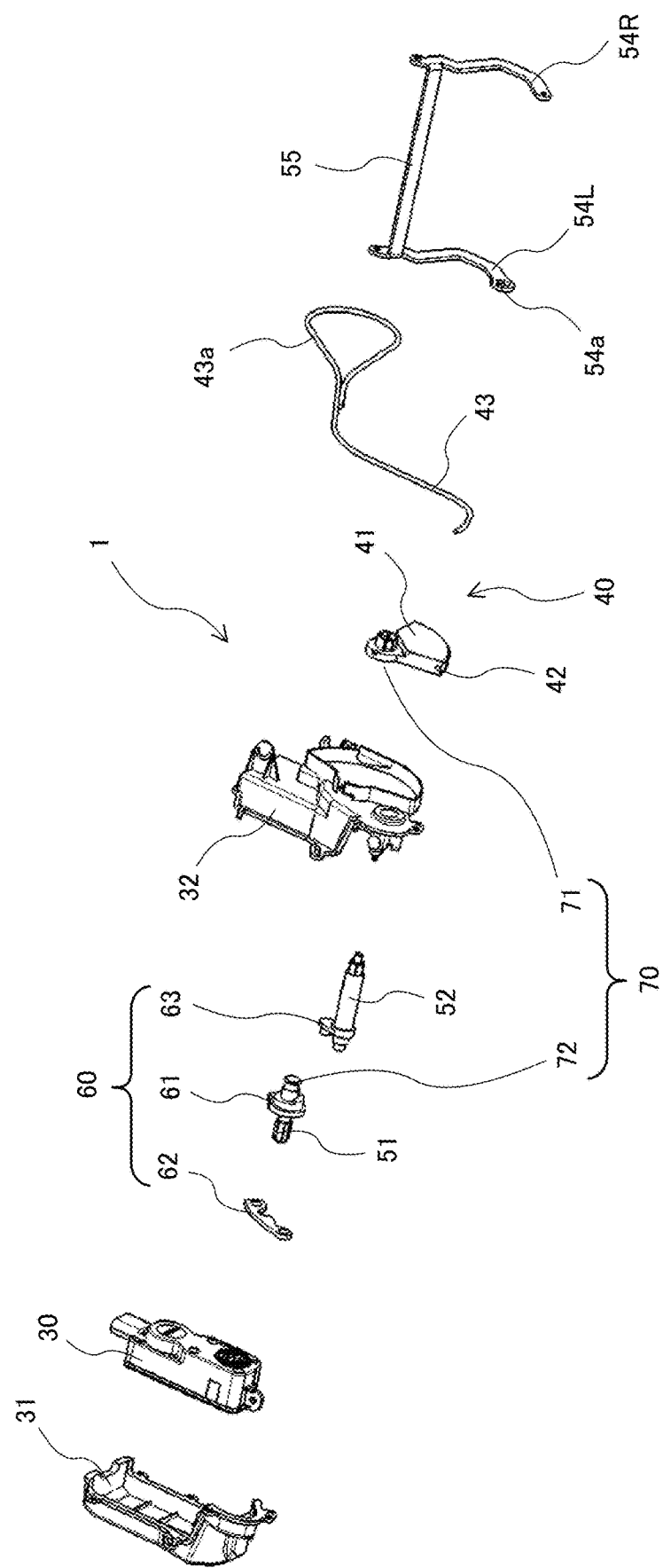
FIG. 6 is an exploded view of a main part of the lid opening/closing device of the embodiment.

The actuator 30 is rotatably housed in a space surrounded by an upper box 31 and a lower box 32 (see FIG. 6). The actuator 30 is housed in the above space by fastening the upper box 31 and the lower box 32. The actuator 30 is mounted and fixed to the base member 10 in a state where the actuator 30 is housed in the above space.

Figure 5:
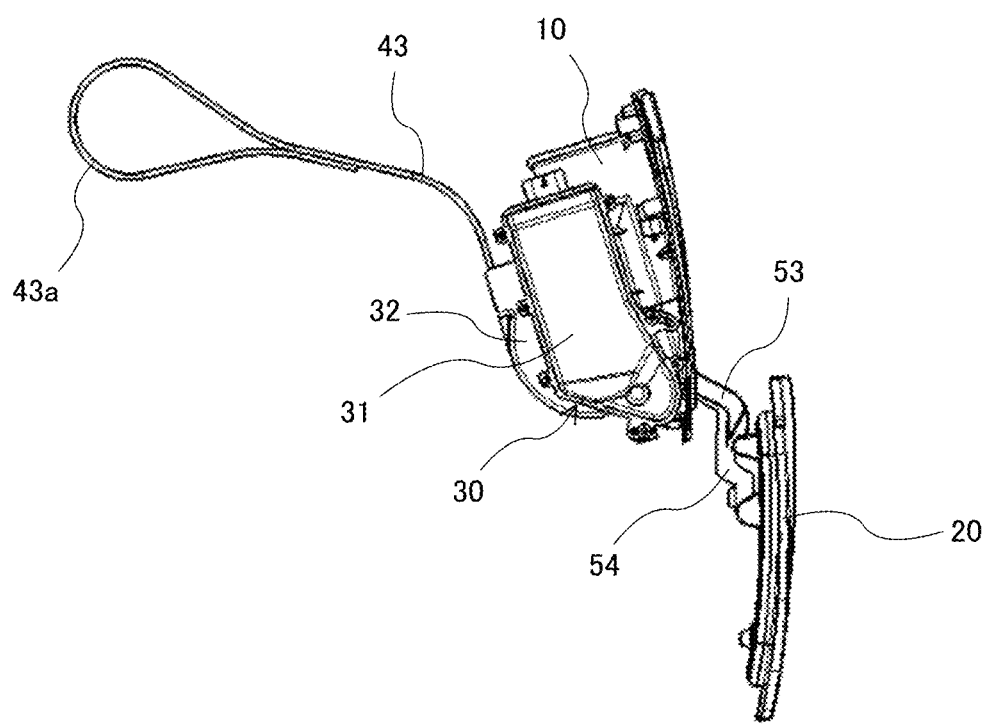
FIG. 5 is a side view of the lid opening/closing device of the embodiment at the lid opened position.

The external force operation mechanism 40 is a mechanism that operates to convert an external force caused by a manual operation into power (hereinafter, referred to as second power) for opening the lid 20. As shown in FIG. 5 and FIG. 6, the external force operation mechanism 40 includes a rotation member 41 and a wire 43.

Figure 7:
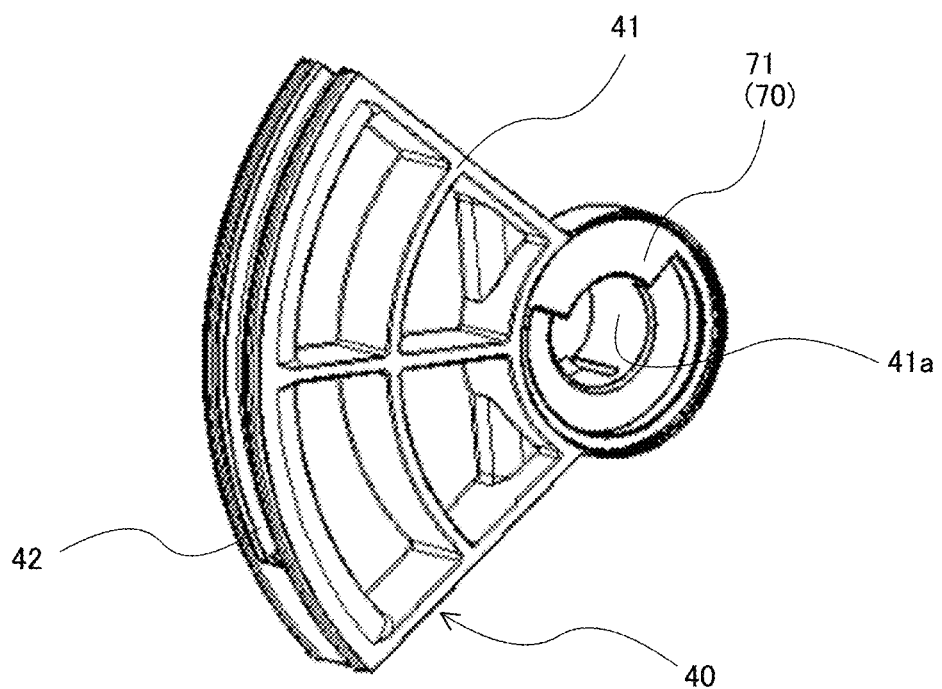
FIG. 7 is a perspective view of a rotation member of an external force operation mechanism included in a power transmission mechanism of the lid opening/closing device of the embodiment.

The rotation member 41 is a rotatable member. The rotation member 41 only has to be shaped so as to allow the rotation member 41 to rotate by a force acting in the circumferential direction, and is formed in a sector shape as shown in FIG. 6 and FIG. 7. The rotation member 41 may be formed in a disk shape or a cylindrical shape, for example. The rotation member 41 is integrally incorporated into the power transmission mechanism 50.

Figure 11:
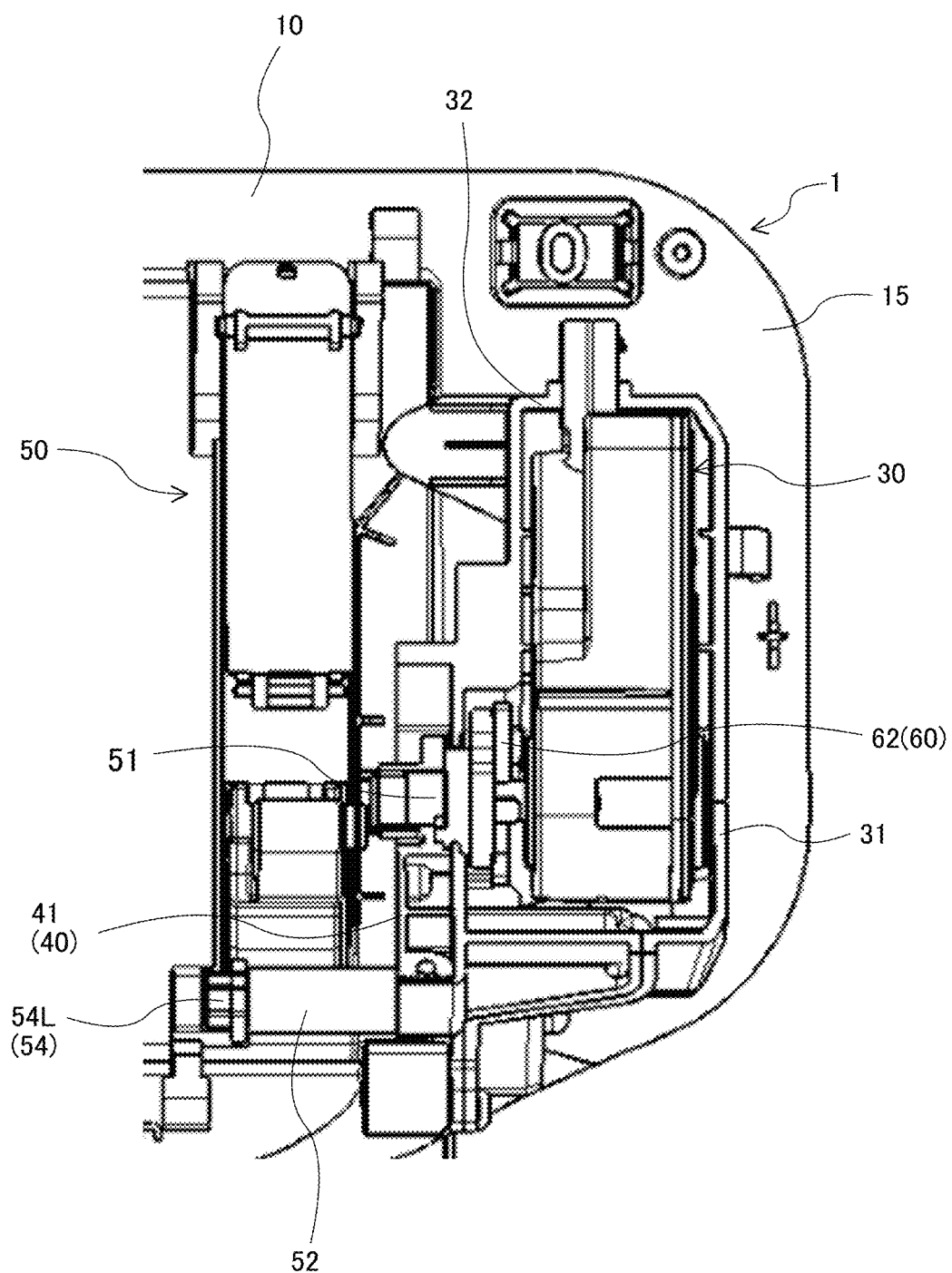
FIG. 11 is a diagram for describing a placement relationship between components included in the lid opening/closing device of the embodiment (specifically, a view of the placement relationship between the components as seen from the back side)

The rotation member 41 is placed outside the space surrounded by the upper box 31 and the lower box 32. The rotation member 41 is placed so as to be exposed to the outside of the lower box 32 (specifically, the outside on the side opposite to the upper box 31 side in the lower box 32). As shown in FIG. 6 and FIG. 11, the rotation member 41 is placed on a side, which is the same as the side on which a first shaft 51 described later is placed, with respect to the actuator 30, and is placed on the inner side, that is, closer to the center, of the base member 10 and the lid 20 with respect to the actuator 30. The rotation member 41 is rotatably supported on the lower box 32, and is rotatable coaxially with an output shaft of the actuator 30. The rotation axis of the rotation member 41 coincides with the rotation axis of the actuator 30, and is coaxial with the rotation axis of the actuator 30.

The rotation member 41 has a groove 42 formed at an outer edge thereof. The groove 42 is open radially outward. The wire 43 is an external force application portion that applies an external force to the rotation member 41. One end portion of the wire 43 is fixed on the outer periphery of the rotation member 41. The wire 43 is configured such that a part thereof is fitted along the groove 42 of the rotation member 41. An operation portion 43a which is capable of being pulled and operated by the operator is provided at another end portion of the wire 43. When the operation portion 43a is pulled and operated in an emergency, the wire 43 is pulled in a tangential direction with a fixed point on the outer periphery of the rotation member 41 as a fulcrum, thereby applying an external force caused by the manual operation to the rotation member 41. When the external force is applied from the wire 43 to the rotation member 41, the rotation member 41 rotates in the forward direction so as to convert the external force into the second power.

The power transmission mechanism 50 is a mechanism that transmits the first power generated by the actuator 30 and the second power generated by the operation of the external force operation mechanism 40, to the lid 20. The power transmission mechanism 50 includes the first shaft 51, a second shaft 52, a shaft-to-shaft transmission mechanism 60, an engagement switching portion 70, a first arm 53, and a second arm 54.

The first shaft 51 is a shaft member that is rotatable by the first power generated by the actuator 30 and is also rotatable by the second power generated by the operation of the external force operation mechanism 40. The first shaft 51 extends coaxially with the output shaft of the actuator 30. The first shaft 51 is axially fitted at one axial end thereof to the output shaft of the actuator 30. When the actuator 30 rotates, the first power is transmitted from the actuator 30 to the one axial end side of the first shaft 51. In this case, the first shaft 51 rotates about an axial center Z1 integrally with the output shaft of the actuator 30 as the output shaft of the actuator 30 rotates. The first shaft 51 may be the output shaft of the actuator 30 itself. In addition, the first shaft 51 may not necessarily be coaxial with the output shaft of the actuator 30, and may be connected to the output shaft via a speed reducer or a link.

As shown in FIG. 6 and FIG. 11, the first shaft 51 is placed on one side in an axial direction with respect to the actuator 30, and specifically, the first shaft 51 is placed on the inner side, that is, closer to the center, of the base member 10 and the lid 20 with respect to the actuator 30. The first shaft 51 projects in the axial direction from the inner side to the outer side of the lower box 32 (i.e., the side opposite to the upper box 31 side). That is, the first shaft 51 is placed such that the one axial end thereof is connected to the output shaft of the actuator 30 and the other axial end thereof is located outside the lower box 32. The first shaft 51 is rotatably supported on the lower box 32. The above rotation member 41 is rotatable about the axial center Z1 coaxially with the output shaft of the actuator 30 and further the first shaft 51.

When the second power is generated in the external force operation mechanism 40, an engagement portion 71 and a to-be-engaged portion 72 of the engagement switching portion 70, which will be described later, are not engaged with each other, and thus no power is transmitted from the external force operation mechanism 40 to the first shaft 51. On the other hand, when the second power is generated in the external force operation mechanism 40, the engagement portion 71 and the to-be-engaged portion 72 are brought into engagement with each other, and thus the second power is transmitted from the external force operation mechanism 40 to the first shaft 51. In this case, the first shaft 51 rotates in the forward direction about the axial center Z1 integrally with the rotation member 41 of the external force operation mechanism 40 as the rotation member 41 rotates.

The second shaft 52 is a shaft member that rotates to open/close the lid 20 as the first shaft 51 rotates. The second shaft 52 is connected to the first shaft 51. Specifically, the second shaft 52 is connected to the first shaft 51 via the shaft-to-shaft transmission mechanism 60. The axial center Z1 of the first shaft 51 and an axial center Z2 of the second shaft 52 extend parallel to each other. The first shaft 51 and the second shaft 52 are placed so as to be spaced apart from each other in a radial direction thereof. That is, the axial center Z2 of the second shaft 52 extends parallel to the axial center Z1 of the first shaft 51 at a position different from that of the axial center Z1. The second shaft 52 is rotatably supported on the lower box 32.

Figure 9:
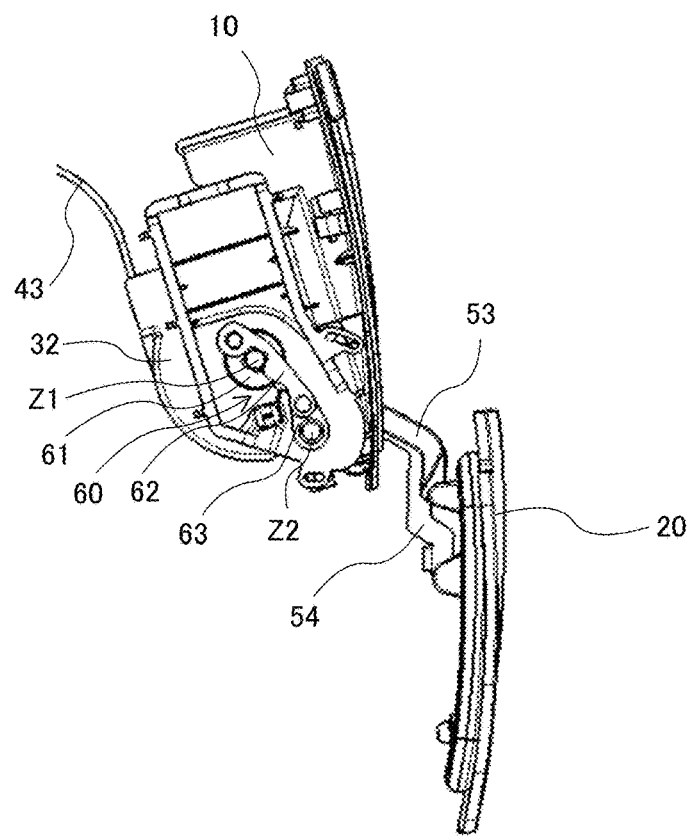
FIG. 9 is a diagram for describing the operation of a shaft-to-shaft transmission mechanism of the power transmission mechanism included in the lid opening/closing device of the embodiment (specifically, a view of the shaft-to-shaft transmission mechanism as seen from the lateral side)
Figure 10:
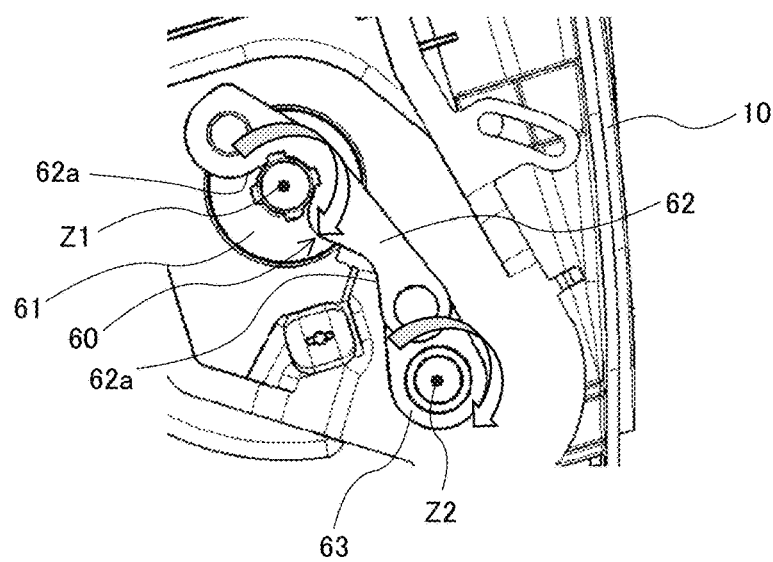
FIG. 10 is an enlarged view of the shaft-to-shaft transmission mechanism shown in FIG. 9.

The shaft-to-shaft transmission mechanism 60 is a link mechanism that performs power transmission between the first shaft 51 and the second shaft 52. The shaft-to-shaft transmission mechanism 60 transmits the first power or the second power from the first shaft 51 to the second shaft 52. As shown in FIG. 9 and FIG. 10, the shaft-to-shaft transmission mechanism 60 includes a first link 61, a second link 62, and a third link 63. The first link 61, the second link 62, and the third link 63 are each formed in an arm plate shape. The first link 61, the second link 62, and the third link 63 are connected in series between the first shaft 51 and the second shaft 52 in this order. The first link 61, the second link 62, and the third link 63 are housed in the space surrounded by the upper box 31 and the lower box 32.

The first link 61 is configured such that one end portion thereof is connected to and integrated with the first shaft 51 (specifically, on its axis) so as to be rotatable about the axial center Z1 and another end portion thereof is relatively rotatably supported on one end portion of the second link 62. The second link 62 is configured such that the one end portion thereof is relatively rotatably supported on the other end portion of the first link 61 and another end portion thereof is relatively rotatably supported on one end portion of the third link 63. The third link 63 is configured such that the one end portion thereof is relatively rotatably supported on the other end portion of the second link 62 and another end portion thereof is connected to and integrated with the second shaft 52 (specifically, its axial one end portion) so as to be rotatable about the axial center Z2.

The first link 61 rotates about the axial center Z1 integrally with the first shaft 51 as the first shaft 51 rotates. The first link 61 may be integrally formed on the outer circumferential surface of the first shaft 51, or may be mounted and fixed so as to be integrated with the outer circumferential surface of the first shaft 51. The second link 62 moves (changes a posture thereof) in conjunction with the rotation of the first link 61. The third link 63 rotates about the axial center Z2 integrally with the second shaft 52 in conjunction with the movement of the second link 62. The second shaft 52 rotates about the axial center Z2 in conjunction with the rotation of the third link 63. The third link 63 may be integrally formed on the outer circumferential surface of the second shaft 52, or may be mounted and fixed so as to be integrated with the outer circumferential surface of the second shaft 52.

The second link 62 includes a thinned portion 62a which is partially cut out as shown in FIG. 10. The thinned portion 62a is provided to prevent interference with the first shaft 51 on the axial center Z1 near the lid closed position when the lid 20 is closed, or to prevent interference with the second shaft 52 on the axial center Z2 near the lid opened position when the lid 20 is opened, and to expand the range of rotation of the second link 62 as compared to a structure having no thinned portion 62a. The second link 62 may be formed in a band shape having a certain width instead of having the thinned portion 62a.

The engagement switching portion 70 is a portion that switches between engagement and disengagement of the rotation member 41 and the first shaft 51. When the second power is generated by the operation of the external force operation mechanism 40, the engagement switching portion 70 brings the rotation member 41 and the first shaft 51 into engagement with each other such that the second power is transmitted to the second shaft 52 via the first shaft 51 and the second shaft 52 rotates. When the above second power is not generated, the engagement switching portion 70 disengages the rotation member 41 and the first shaft 51 from each other. When the first power is generated by the actuator 30, unless the above second power is generated, the engagement switching portion 70 disengages the rotation member 41 and the first shaft 51 from each other such that the first power is transmitted to the second shaft 52 via the first shaft 51 and the second shaft 52 rotates.

The engagement switching portion 70 includes the engagement portion 71 and the to-be-engaged portion 72 capable of being engaged with the engagement portion 71. The engagement portion 71 is provided to the rotation member 41. The to-be-engaged portion 72 is provided to the first shaft 51. The engagement portion 71 and the to-be-engaged portion 72 are disengaged from each other at the timing when the first power is generated, and are engaged with each other at the timing when the second power is generated.

In other words, the engagement portion 71 and the to-be-engaged portion 72 are not engaged with each other when the first shaft 51 is rotated by the first power generated by the actuator 30, that is, at the timing when the lid 20 is opened/closed between the closed position and the opened position by the first power. On the other hand, the engagement portion 71 and the to-be-engaged portion 72 are engaged with each other when the second power is generated by the external force operation mechanism 40 as a result of operation of the wire 43, that is, at the timing when the lid 20 is opened from the closed position to the opened position by the second power.

The engagement portion 71 is integrally formed with the rotation member 41 of the external force operation mechanism 40, or is mounted and fixed to the rotation member 41 as a member separate from the rotation member 41. The rotation member 41 has a shaft hole 41a into which an axial end portion of the first shaft 51 is inserted. As shown in FIG. 7, the engagement portion 71 is formed in a bulge shape so as to project from an inner wall near the shaft hole 41a toward the axial center Z1. The engagement portion 71 is provided only in a partial angular range (e.g., 90°) of the entire circumferential range of the shaft hole 41a. The engagement portion 71 is formed in a sector shape.

Figure 8:
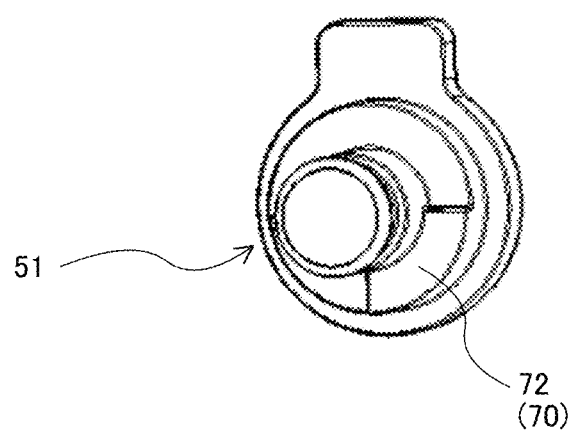
FIG. 8 is a perspective view of a main part of a first shaft included in the power transmission mechanism of the lid opening/closing device of the embodiment.

The to-be-engaged portion 72 is integrally formed with the first shaft 51, or is mounted and fixed to the first shaft 51 as a member separate from the first shaft 51. As shown in FIG. 8, the to-be-engaged portion 72 is formed in a bulge shape so as to project radially outward from the shaft body outer surface of the first shaft 51. The to-be-engaged portion 72 is provided only in a partial angular range (e.g., 90°) of the entire circumferential range of the first shaft 51. The to-be-engaged portion 72 is formed in a sector shape.

The engagement portion 71 may project over the entirety of the above partial angular range of the entire circumferential range of the above shaft hole 41a, but only has to project at least at both ends of the partial angular range. In addition, the to-be-engaged portion 72 may project over the entirety of the above partial angular range of the entire circumferential range of the first shaft 51, but only has to project at least at both ends of the partial angular range.

The sum of the angular range of the engagement portion 71 and the angular range of the to-be-engaged portion 72 is less than 360°. The angular range of the engagement portion 71 and the angular range of the to-be-engaged portion 72 are set such that: disengagement between the engagement portion 71 and the to-be-engaged portion 72 continues when the lid 20 is opened/closed between the closed position and the opened position by the first power; and engagement between the engagement portion 71 and the to-be-engaged portion 72 continues when the lid 20 is opened from the closed position to the opened position by the second power.

The engagement portion 71 and the to-be-engaged portion 72 are each formed such that the side surface of a bulge-shaped portion thereof faces in the circumferential direction. The engagement portion 71 and the to-be-engaged portion 72 are brought into engagement with each other by the side surfaces thereof coming into contact with each other, and are disengaged from each other by the side surfaces thereof being separated from each other in the circumferential direction.

The rotation member 41 and the first shaft 51 are placed and configured such that the engagement portion 71 and the to-be-engaged portion 72 are disengaged from each other when the first power is not generated by the actuator 30, the wire 43 is not manually operated, and no external force is applied to the rotation member 41. When the first power is generated by the actuator 30, the rotation member 41 is positioned with respect to the first shaft 51 in an idle range where the engagement portion 71 and the to-be-engaged portion 72 are not engaged with each other. In addition, when the second power is generated by the operation of the external force operation mechanism 40, the rotation member 41 rotates integrally with the first shaft 51 in a state where the engagement portion 71 and the to-be-engaged portion 72 are engaged with each other.

When the first power is generated by the actuator 30, the first shaft 51 rotates about the axial center Z1 by the first power, but the engagement portion 71 and the to-be-engaged portion 72 are disengaged from each other. This disengagement state is constantly maintained in a process in which the lid 20 is opened/closed between the closed position and the opened position. At this time, the first power is transmitted to the second shaft 52 via the first shaft 51, so that the second shaft 52 rotates by the first power.

On the other hand, when the first power is not generated by the actuator 30 but an external force caused by a manual operation is applied to the wire 43, the external force is transmitted to the rotation member 41 and becomes a force to rotate the rotation member 41 about the axial center Z1. In this case, the external force to the wire 43 is converted into the second power for opening the lid 20. When the rotation member 41 rotates, the engagement portion 71 and the to-be-engaged portion 72 are brought into engagement with each other, and the second power is transmitted to the first shaft 51. This engagement state is maintained until the lid 20 reaches the opened position from the closed position. At this time, the rotation member 41 and the first shaft 51 rotate integrally in a state where the engagement portion 71 and the to-be-engaged portion 72 are engaged with each other, so that the second shaft 52 rotates by the second power.

The rotation of the second shaft 52 by the second power may be performed in a narrower angular range than the rotation of the second shaft 52 by the first power. That is, the rotation of the second shaft 52 by the first power may be performed such that the lid 20 is opened/closed between the closed position and the opened position at which the lid 20 is fully opened, and the rotation of the second shaft 52 by the second power may be performed such that the lid 20 is opened from the closed position to a predetermined opened position that is before the fully-opened position (e.g., to an opened position from which the lid 20 is allowed to be manually moved to the opened position at which the lid 20 is fully opened, by the operator).

The first arm 53 and the second arm 54 are arm members that rotate in synchronization with each other by the rotation of the second shaft 52, thereby opening/closing the lid 20 while maintaining a state where the lid 20 is parallel to the vehicle body surface 2 and the opening 14. The first arm 53 and the second arm 54 are interposed between the base member 10 side and the lid 20 side. The first arm 53 and the second arm 54 are placed in parallel with each other between the base member 10 side and the lid 20 side. The first arm 53 and the second arm 54 are placed on the side, which is the same as the side on which the first shaft 51 is placed, with respect to the actuator 30, and is placed closer to the center of the base member 10 with respect to the actuator 30.

As the first arm 53, a pair of arms are provided so as to be spaced apart from each other in the right-left direction when seen from the front side of the lid 20. As the second arm 54, a pair of arms are provided so as to be spaced apart from each other in the right-left direction when seen from the front side of the lid 20. Hereinafter, the first arm 53 on the right side and the first arm 53 on the left side are respectively referred to as first arm 53R and first arm 53L as appropriate, and the second arm 54 on the right side and the second arm 54 on the left side are respectively referred to as second arm 54R and second arm 54L as appropriate. The second arm 54R and the second arm 54L are coupled to each other via a coupling bar 55 (see FIG. 4 and FIG. 6). The first arm 53R and the first arm 53L may be coupled to each other via a coupling bar or the like, but may not necessarily be coupled to each other.

The second shaft 52 is configured such that one axial end portion thereof is connected to the first shaft 51 (specifically, the other end portion of the third link 63 of the shaft-to-shaft transmission mechanism 60) and another axial end portion thereof is connected to the lid 20 (specifically, the second arm 54 (e.g., the second arm 54L on the left side)). The one axial end portion of the second shaft 52 is integrated with the third link 63. The other axial end portion of the second shaft 52 is inserted into a fitting hole 54a provided in the second arm 54 and is integrated with the second arm 54. The second arm 54 rotates about the axial center Z2 as the second shaft 52 rotates.

The first arms 53 and the second arms 54 are each a member extending in an arm shape with one end portion in the arm longitudinal direction thereof being rotatably supported on the base member 10 and another end portion in the arm longitudinal direction thereof being rotatably supported on the lid 20. Each first arm 53 is, for example, formed in a thick shape such that the thickness in the axial direction, at each fulcrum thereof, orthogonal to the arm longitudinal direction has a predetermined width. Each second arm 54 is formed in a thin shape such that the thickness in the axial direction at each fulcrum thereof is smaller than that of the first arm 53. The axial direction of the first arm 53 and the second arm 54 is the above right-left direction.

The pair of right and left first arms 53R and 53L have a bilaterally symmetrical shape and rotate in synchronization with each other on the same axis at both end portions in the arm longitudinal direction thereof. The pair of right and left second arms 54R and 54L have a bilaterally symmetrical shape and rotate in synchronization with each other on the same axis at both end portions in the arm longitudinal direction thereof. The first arms 53 and the second arms 54 cooperatively rotate in synchronization with each other, thereby opening/closing the lid 20.

The one end portion of each first arm 53 is supported on a first base member fulcrum of the base member 10. The other end portion of each first arm 53 is supported on a first lid fulcrum of the lid 20. Each first arm 53 extends so as to be curved between the first base member fulcrum and the first lid fulcrum. The one end portion of each second arm 54 is supported on a second base member fulcrum of the base member 10, and is integrated with the second shaft 52. The other end portion of each second arm 54 is supported on a second lid fulcrum of the lid 20. Each second arm 54 extends so as to be curved between the second base member fulcrum and the second lid fulcrum.

The first base member fulcrum and the second base member fulcrum described above are provided on the back surface side of the bottom wall portion 11 of the base member 10. The first base member fulcrum is provided above the second base member fulcrum. The first lid fulcrum and the second lid fulcrum are provided on the back surface side of the lid 20. The first lid fulcrum is provided above the second lid fulcrum at a position different from that of the first base member fulcrum. The second lid fulcrum is provided at a position different from that of the second base member fulcrum. Each first arm 53 is located above each second arm 54. Each first arm 53 rotates relative to the base member 10 about the first base member fulcrum, and rotates relative to the lid 20 about the first lid fulcrum. Each second arm 54 rotates relative to the base member 10 about the second base member fulcrum, and rotates relative to the lid 20 about the second lid fulcrum.

The bottom wall portion 11 of the base portion 10 has a second through hole 11*b* and a third through hole 11*c*. The second through hole 11*b* is a hole through which the first arm 53R and the second arm 54R on the right side penetrate. The third through hole 11*c* is a hole through which the first arm 53L and the second arm 54L on the left side penetrate. The second through hole 11*b* is provided on the right side of the first through hole 11*a*. The third through hole 11*c* is provided on the left side of the first through hole 11*a*. The second through hole 11*b* and the third through hole 11*c* are each formed in a long hole shape extending in the up-down direction so as to permit the first arm 53 and the second arm 54 to rotate during opening/closing of the lid 20. The second through hole 11*b* and the third through hole 11*c* may be connected to the first through hole 11*a* and formed as one hole.

The first arms 53 and the second arms 54 cooperate with each other to rotate about the respective fulcrums while maintaining a state where the pair of first arms 53 are substantially parallel to each other and maintaining a state where the pair of second arms 54 are substantially parallel to each other. In this case, the lid 20 is opened/closed, while maintaining a state of being parallel to the vehicle body surface 2 and the opening 14, by the synchronized rotation of the first arms 53 and the second arms 54.

Figure 12:
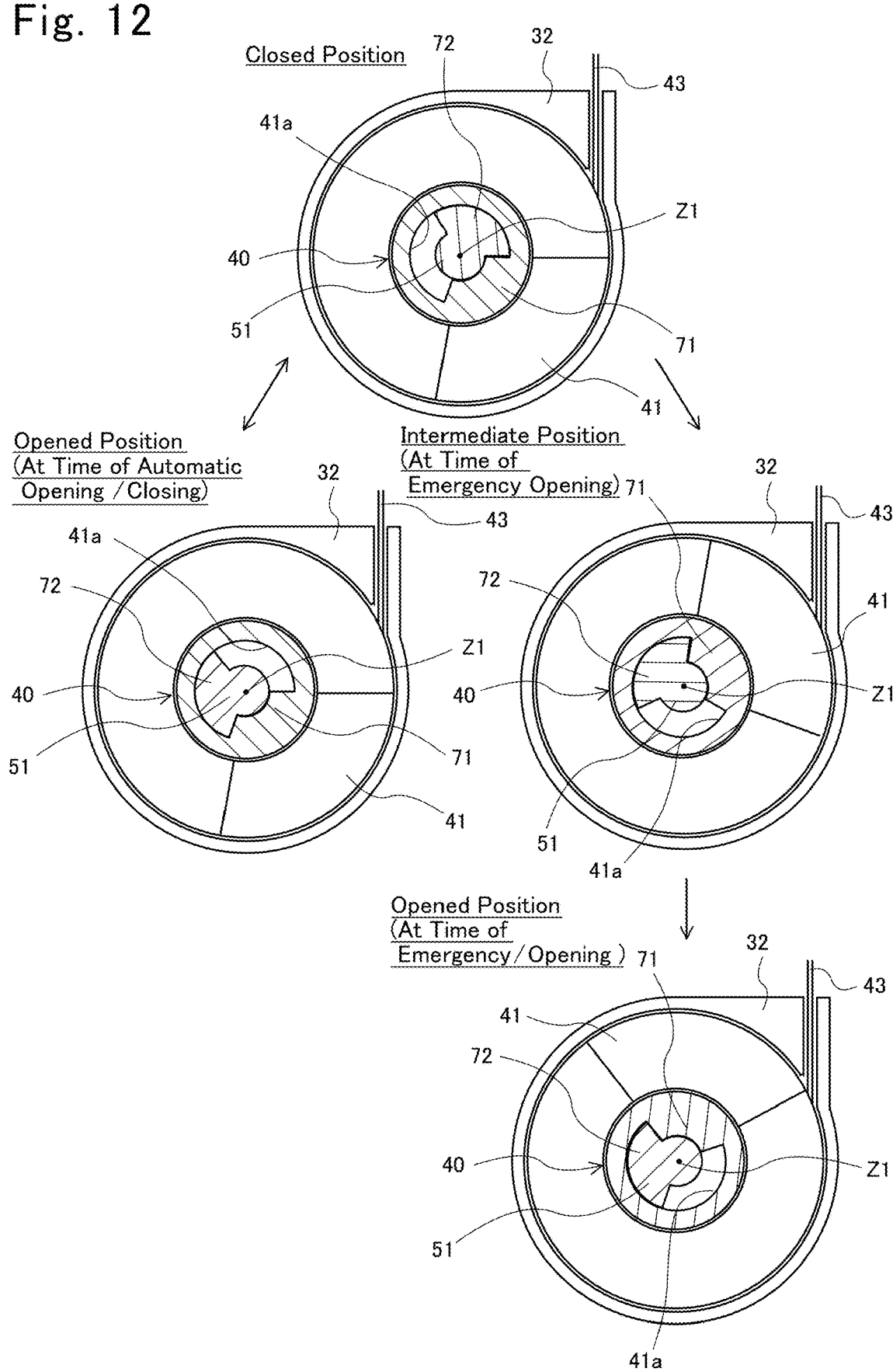
FIG. 12 is a diagram illustrating a positional relationship between the first shaft and the external force operation mechanism during opening/closing of a lid of the lid opening/closing device of the embodiment (specifically, a view as seen in an axial direction).

Next, the operation of the lid opening/closing device 1 will be described with reference to FIG. 12.

In the lid opening/closing device 1, when no operation is performed, the actuator 30 is not rotationally driven, and the wire 43 is not pulled and operated, the first power is not generated by the actuator 30, and the second power is not generated by the operation of the external force operation mechanism 40, so that the lid 20 is locked at the closed position by frictional force or the like. When the lid 20 is at the closed position, the engagement portion 71 at the rotation member 41 and the to-be-engaged portion 72 at the first shaft 51 are maintained in a positional relationship as shown in the upper part of FIG. 12.

When a predetermined switch opening operation is performed by the operator at the closed position of the lid 20, the actuator 30 generates the first power for opening the lid 20. When the first power is generated by the actuator 30, the first shaft 51 rotates in the forward direction about the axial center Z1 integrally with the actuator 30 as the actuator 30 rotates in the forward direction. When the first shaft 51 rotates in the forward direction, the first power is transmitted to the second shaft 52 via the shaft-to-shaft transmission mechanism 60. When this transmission is performed, the second shaft 52 rotates in the forward direction about the axial center Z2 in conjunction with the rotation of the third link 63 of the shaft-to-shaft transmission mechanism 60.

When the second shaft 52 rotates in the forward direction by the first power as described above, each second arm 54 rotates in the forward direction by the rotation of the second shaft 52, and each first arm 53 rotates in the forward direction in synchronization with the rotation of the second arm 54. When each first arm 53 and each second arm 54 rotate in the forward direction, the lid 20 is opened from the closed position toward the opened position while maintaining the state of being parallel to the vehicle body surface 2 and the opening 14. The opening motion of the lid 20 is continued until reaching the opened position at which the lid 20 is fully opened.

When a predetermined switch closing operation is performed at the opened position of the lid 20, the actuator 30 generates the first power for closing the lid 20. When the first power is generated by the actuator 30, the first shaft 51 rotates in the reverse direction about the axial center Z1 integrally with the actuator 30 as the actuator 30 rotates in the reverse direction. When the first shaft 51 rotates in the reverse direction, the first power is transmitted to the second shaft 52 via the shaft-to-shaft transmission mechanism 60. When this transmission is performed, the second shaft 52 rotates in the reverse direction about the axial center Z2 in conjunction with the rotation of the third link 63 of the shaft-to-shaft transmission mechanism 60.

When the second shaft 52 rotates in the reverse direction by the first power as described above, each second arm 54 rotates in the reverse direction by the rotation of the second shaft 52, and each first arm 53 rotates in the reverse direction in synchronization with the rotation of the second arm 54. When each first arm 53 and each second arm 54 rotate in the reverse direction, the lid 20 is closed from the opened position toward the closed position while maintaining the state of being parallel to the vehicle body surface 2 and the opening 14. The closing motion of the lid 20 is continued until reaching the closed position.

Therefore, in the lid opening/closing device 1, when a predetermined switch operation is performed by the operator, the actuator 30 is caused to generate the first power, and the first power is transmitted to the first shaft 51 of the power transmission mechanism 50, the shaft-to-shaft transmission mechanism 60, the second shaft 52, each second arm 54 and each first arm 53, and the lid 20 in this order to open/close the lid 20 between the closed position and the opened position.

When the lid 20 is opened/closed between the closed position and the opened position by the first power generated by the actuator 30, a state where the engagement portion 71 and the to-be-engaged portion 72 of the engagement switching portion 70 are not engaged with each other, continues. Therefore, when the lid 20 is automatically opened/closed between the closed position and the opened position by the first power generated by the actuator 30, the engagement portion 71 at the rotation member 41 and the to-be-engaged portion 72 at the first shaft 51 are not engaged with each other, so that no force for rotating the rotation member 41 is applied to the rotation member 41 by the rotation of the first shaft 51.

On the other hand, when the wire 43 is pulled and operated by an external force by the operator at the fully-closed position of the lid 20, the external force is applied to the rotation member 41, and the rotation member 41 rotates in the forward direction so as to convert the external force into the second power. When the rotation member 41 rotates in the forward direction, the side surface of the engagement portion 71 at the rotation member 41 comes into contact with the side surface of the to-be-engaged portion 72 at the first shaft 51, and the engagement portion 71 and the to-be-engaged portion 72 are brought into engagement with each other, whereby the first shaft 51 rotates in the forward direction integrally with the rotation member 41 as the rotation member 41 rotates. When the first shaft 51 rotates in the forward direction by the second power, the second power is transmitted to the second shaft 52 via the shaft-to-shaft transmission mechanism 60, whereby the second shaft 52 rotates in the forward direction about the axial center Z2 in conjunction with the rotation of the third link 63 of the shaft-to-shaft transmission mechanism 60.

When the second shaft 52 rotates in the forward direction by the second power as described above, each second arm 54 rotates in the forward direction by the rotation of the second shaft 52, and each first arm 53 rotates in the forward direction in synchronization with the rotation of the second arm 54. When each first arm 53 and each second arm 54 rotate in the forward direction, the lid 20 is opened from the closed position toward the opened position while maintaining the state of being parallel to the vehicle body surface 2 and the opening 14. The opening motion of the lid 20 by the second power is continued until reaching the opened position at which the lid 20 is fully opened, or until reaching the predetermined opened position, which is before the fully-opened position.

Therefore, in the lid opening/closing device 1, when the wire 43 is pulled and operated by the operator at the closed position of the lid 20, the rotation member 41 is caused to convert the external force caused by the manual operation of the operator into the second power, and the engagement portion 71 at the rotation member 41 and the to-be-engaged portion 72 at the first shaft 51 are brought into engagement with each other, whereby the second power is transmitted to the first shaft 51 of the power transmission mechanism 50, the shaft-to-shaft transmission mechanism 60, the second shaft 52, each second arm 54 and each first arm 53, and the lid 20 in this order to open the lid 20 from the closed position.

With this configuration, during normal operation in which no failure occurs in the actuator 30, the lid 20 is opened/closed by the first power generated by the actuator 30. In addition, in an emergency in which a failure occurs in the actuator 30, by pulling and operating the wire 43, the external force caused by the manual operation is converted into the second power by the rotation member 41, and the lid 20 is opened by the second power. Therefore, even in an emergency in which a failure occurs in the actuator 30, the opening motion of the lid 20 is ensured, and a situation in which the lid 20 is locked at the closed position is avoided. Accordingly, an opportunity of supplying fuel to the vehicle or charging the vehicle is ensured in an emergency.

In the automatic opening/closing process in which the lid 20 is opened/closed between the fully-closed position and the fully-opened position by the first power in a state where no failure occurs in the actuator 30, the engagement portion 71 and the to-be-engaged portion 72 are not engaged with each other, so that the first power is not transmitted from the first shaft 51 to the rotation member 41, and the rotation member 41 is rotated or the wire 43 is not unexpectedly operated by the first power. Therefore, loosening of the wire 43, etc., are avoided during the lid automatic opening/closing. Accordingly, deterioration of the wire 43 is suppressed, and the necessity to provide a space for suppressing interference with other components due to loosening of the wire 43 is eliminated, thereby downsizing the external force operation mechanism 40 and further the lid opening/closing device 1.

The power transmission path through which the first power generated by the actuator 30 is transmitted to the lid 20 and the power transmission path through which the second power generated by the operation of the external force operation mechanism 40 is transmitted to the lid 20 are shared in that the first shaft 51, the shaft-to-shaft transmission mechanism 60, the second shaft 52, each first arm 53, and each second arm 54 are used. Therefore, the number of components for forming the lid opening/closing device 1 is reduced.

Furthermore, in the lid opening/closing device 1, the rotation member 41 of the external force operation mechanism 40 is integrally incorporated into the power transmission mechanism 50. The rotation member 41 is placed on the side, which is the same as the side on which the first shaft 51 of the power transmission mechanism 50 is placed, with respect to the actuator 30. In this structure, in assembling the rotation member 41 and the first shaft 51 to the actuator 30, assembly work is performed from one side in the axial direction with respect to the actuator 30, and assembly work from both sides in the axial direction of the actuator 30 is unnecessary. Therefore, the assemblability of the lid opening/closing device 1 is improved.

The first shaft 51 is placed closer to the center of the base member 10 with respect to the actuator 30. In addition, the rotation member 41 is placed on the side, which is the same as the side on which the first shaft 51 is placed, with respect to the actuator 30 as described above, and is placed closer to the center of the base member 10 with respect to the actuator 30.

In the above structure, as compared to a comparative structure in which the rotation member 41 is placed closer to the outside of the base member 10 with respect to the actuator 30, the position of the rotation fulcrum of the rotation member 41 is brought closer to the action point of the first shaft 51 (specifically, the connection position with the shaft-to-shaft transmission mechanism 60) on the axial center Z1, and the distance between the position of the rotation fulcrum of the rotation member 41 and the action point of the first shaft 51 on the axial center Z1 is shortened.

Therefore, according to the structure of the lid opening/closing device 1, when the wire 43 of the external force operation mechanism 40 is pulled and operated, distortion or deformation of the rotation member 41 and the first shaft 51 is made less likely to occur as compared to the above comparative structure, so that the loss that occurs until the external force caused by the manual operation of the operator is transmitted as the second power to the first shaft 51 via the rotation member 41 is reduced. Therefore, the operation load on the wire 43 to open the lid 20 to the desired opened position is decreased, so that the operation burden on the operator is reduced.

Meanwhile, in the above embodiment, the actuator 30 is capable of generating not only the first power for opening the lid 20 but also the first power for closing the lid 20. That is, the lid 20 is automatically opened/closed by the first power generated by the actuator 30. However, the present invention is not limited thereto, and the actuator 30 may generate only the first power for opening the lid 20, the lid 20 may be automatically opened by the first power generated by the actuator 30, and the present invention may be applied to a device in which the lid 20 is manually closed.

In the above embodiment, the present invention is applied to the structure in which the lid 20 is opened/closed while maintaining the state of being parallel to the vehicle body surface 2. However, the present invention is not limited thereto, and may be applied to a structure in which the lid 20 is opened/closed in the up-down direction or the right-left direction about an axis substantially parallel to the vehicle body surface 2.

The present invention is not limited to the above-described embodiment and modifications, and various changes may be made without departing from the gist of the present invention. In addition, the present specification discloses not only the technical concept indicated by the citation relationship between the claims as originally filed, but also the technical concept obtained by combining the matters recited in each claim as appropriate.

This application claims priority on Japanese Patent Application No. 2022-176796 filed in Japan on Nov. 2, 2022, the entire contents of which are incorporated herein by reference.

The invention claimed is:

1. A lid opening/closing device comprising:
a lid configured to be opened/closed with respect to a base member between a closed position and an opened position;
an actuator configured to generate first power for at least opening the lid;
an external force operation mechanism configured to operate so as to convert an external force caused by a manual operation into second power for opening the lid; and
a power transmission mechanism configured to transmit the first power and the second power to the lid, wherein
the power transmission mechanism includes
a first shaft placed on one side in an axial direction with respect to the actuator and configured to be rotatable by the first power generated by the actuator and to be rotatable by the second power generated by the operation of the external force operation mechanism, and
a second shaft connected to the first shaft, connected to the lid, and configured to rotate to open/close the lid as the first shaft rotates,
the external force operation mechanism includes a rotation member placed on the same axis as the first shaft and configured to be rotatable about the axis,
the power transmission mechanism includes an engagement switching portion configured to disengage the first shaft and the rotation member from each other when the second power is not generated, and to bring the first shaft and the rotation member into engagement with each other such that the second power is transmitted to the second shaft via the first shaft and the second shaft rotates, when the second power is generated, and
the rotation member is integrally incorporated into the power transmission mechanism, and is placed on a side, which is the same as a side on which the first shaft is placed, with respect to the actuator, wherein
the engagement switching portion includes
an engagement portion provided to the rotation member, and
a to-be-engaged portion provided to the first shaft and capable of being engaged with the engagement portion, and
the engagement portion and the to-be-engaged portion are not engaged with each other when the second power is not generated, and are engaged with each other when the second power is generated.

2. The lid opening/closing device according to claim 1, wherein
the first shaft is placed closer to a center of the base member with respect to the actuator, and
the rotation member is placed closer to the center of the base member with respect to the actuator.

3. The lid opening/closing device according to claim 1, wherein, when the second power is not generated, the rotation member is positioned with respect to the first shaft in an idle range where the engagement portion and the to-be-engaged portion are not engaged with each other, and when the second power is generated, the rotation member rotates integrally with the first shaft in a state where the engagement portion and the to-be-engaged portion are engaged with each other.

4. The lid opening/closing device according to claim 1, wherein
the first shaft and the second shaft are placed so as to be spaced apart from each other in a radial direction thereof, and
the power transmission mechanism includes a shaft-to-shaft transmission mechanism configured to perform power transmission between the first shaft and the second shaft.

* * * * *